United States Patent [19]

Shaffer

[11] Patent Number: 4,581,682
[45] Date of Patent: Apr. 8, 1986

[54] PRISMATIC SYMPATHETIC FLASH BARRIERS

[75] Inventor: John W. Shaffer, Williamsport, Pa.

[73] Assignee: GTE Products Corporation, Stamford, Conn.

[21] Appl. No.: 708,766

[22] Filed: Mar. 6, 1985

[51] Int. Cl.⁴ ............................................. G03B 15/02
[52] U.S. Cl. ........................................ 362/16; 362/11; 362/339; 431/359
[58] Field of Search ............... 431/357, 358, 359, 360; 362/3, 11, 13, 16, 17, 339

[56] References Cited

U.S. PATENT DOCUMENTS

| | | | |
|---|---|---|---|
| 4,055,759 | 10/1977 | Bouchard et al. | 431/359 X |
| 4,234,906 | 11/1980 | Schindler | 362/16 |
| 4,243,371 | 1/1981 | Kewley et al. | 431/359 X |
| 4,273,241 | 6/1981 | Smetana | 362/11 X |
| 4,371,913 | 2/1983 | Broadt et al. | 362/17 |

Primary Examiner—Margaret A. Focarino
Attorney, Agent, or Firm—Thomas H. Buffton; Martha Ann Finnegan

[57] ABSTRACT

A miniaturized multilamp photoflash array including a transparent plastic cover member with the cover member having at least one prismatic barrier divider extending outwardly therefrom between a pair of parallel arrayed flashlamps. The prismatic barrier divider serves as a shield whereby sympathetic flashing of adjacent flashlamps is reduced.

12 Claims, 4 Drawing Figures

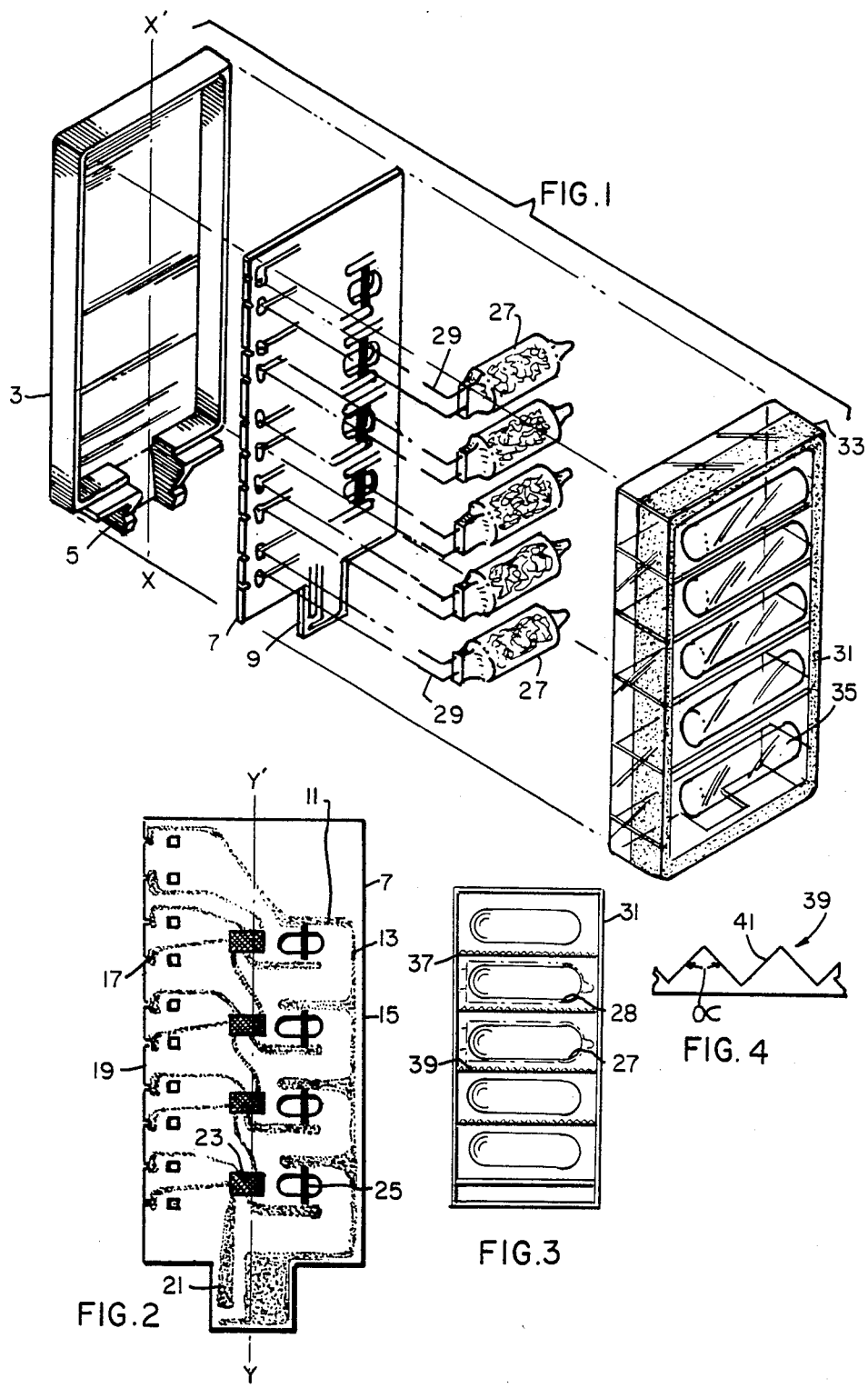

PRISMATIC SYMPATHETIC FLASH BARRIERS

TECHNICAL FIELD

This invention relates to multilamp photoflash arrays and more particularly to multilamp photoflash arrays employing a prismatic barrier divider between a pair of parallel flashlamps.

BACKGROUND ART

For some time sympathetic flashing of one flashlamp by the radiant energy from an adjacent flashlamp in multilamp photoflash arrays has been known. Moreover, it is not unusual for a chain reaction to occur wherein the flashlamps of an entire array are undesirably activated simultaneously. Obviously, such an event is troublesome, expensive and most inconvenient and undesirable.

Until the present time, the most common approach to providing flash protection from undesired sympathetic flashing has been the utilization of opaque reflectors or dividers between adjacent flashlamps. Normally, the array is of a size which permits the employment of reflectors as a separate array component. However, in miniaturized configurations space required for a separate reflector is not available and a different approach was required.

One such approach included the molding of a transparent cover member with a barrier member extending outwardly therefrom and positioned between a pair of adjacent flashlamps to serve as a shield and prevent sympathetic flashing. However, it was found that such transparent divider members were ineffective without a layer of paint or other measures to insure an opaque surface between the flashlamps. Again, the extra operations of painting or coating the divider members undesirably added to the manufacturing cost and, should a divider be left uncoated, resulted in undesired sympathetic flash failures with a consequent loss of lamps for the customer.

OBJECTS AND SUMMARY OF THE INVENTION

An object of the present invention is to provide an improved miniaturized multilamp photoflash array. Another object of the invention is to provide a miniaturized multilamp photoflash array having enhanced sympathetic flash protection. Still another object of the invention is to provide a transparent cover member which includes an enhanced sympathetic flash barrier. A further object of the invention is to overcome the difficulties of the prior art in providing sympathetic flash protection.

These and other objects, advantages and capabilities are achieved in one aspect of the invention by a miniaturized multilamp photoflash array having a base member, a circuit board affixed to the base member, a plurality of parallel arrayed flashlamps affixed to the circuit board and a transparent cover member attached to the base member and enclosing the circuti board and flashlamps with the cover member having at least one prismatic barrier divider extending between a pair of parallel arrayed flashlamps.

BRIEF DESCRIPTION OF THE DRAWINGS

FIG. 1 is an exploded view of a miniaturized multilamp photoflash array of the invention;

FIG. 2 is a planned view of the printed circuit board and circuitry of the embodiment of FIG. 1;

FIG. 3 is a rear elevational view of the transparent cover member of the embodiment of FIG. 1; and FIG. 4 illustrates a preferred form of prismatic surface of a barrier divider of the cover member of FIG. 2.

BEST MODE FOR CARRYING OUT THE INVENTION

For a better understanding of the present invention, together with other and further objects, advantages and capabilities thereof, reference is made to the following disclosure and appended claims in conjunction with the accompanying drawings.

Referring to the drawings, FIG. 1 illustrates a preferred form of miniaturized photoflash array. Therein, a plastic base member 3 has a longitudinal axis X—X' and an outwardly extending tab portion 5. The base member 3 is recessed and formed to receive a circuit board 7.

The circuit board 7 has a longitudinal axis Y—Y' similar to the longitudinal axis X—X' of the base member 3. Also, the circuit board 7 has an outwardly extending tab member 9 formed to fit within the tab portion 5 of the base member 3. Positioned on the surface of the circuit board 7 is an electrically conductive printed circuit 11. The printed circuit 11 includes an electrically conductive common circuit 13 which extends from the tab portion 5 along one edge 15 of the circuit board 7 and in a direction substantially parallel to the longitudinal axis Y—Y'. A plurality of spaced contact pads 17 are aligned along an opposite edge 19 of the circuit board 7 and in a direction substantially parallel to the longitudinal axis Y—Y. Also, an electrically conductive hot circuit 21 extending from the tab member 9 is formed for connection to a plurality of the contact pads 17.

Attached to the printed circuit 11, best illustrated in FIG. 2, are a plurality of normally-open (N/O) switches 23 and a plurality of normally-closed (N/C) switches 25. The normally-open (N/O) switches 23 are formed to provide an electrically conductive path for the hot circuit 21 from one pair of contact pads 17 to the next pair of contact pads upon energization of the N/O switch 23 by energization of a flashlamp. Also, the normally-closed (N/C) switches 25 are formed to connect the electrically conductive common circuit 13 to a contact pad 17 prior to energization of a flashlamp and to disconnect the contact pad 17 from the common circuit upon energization of the flashlamp.

A plurality of flashlamps 27 each having a pair of electrical leads 29 are formed for positioning of the electrical leads 29 along the opposite edge 19 of the circuit board 7 and attachment thereof to the contact pads 17. In this manner the flashlamps 27 are mounted in a manner such that each flashlamp 27 extends in a direction normal to the longitudinal axis Y—Y' of the circuit board 7. Thus, the dimension of the circuit board in a direction normal to the longitudinal axis Y—Y' is dependent upon the length of the flashlamps 27. Moreover, the flashlamps 27 are mounted in a manner such that the leads 29 are easily arrayed along the edge 19 of the circuit board 7.

Enclosing the circuit board 7 and the flashlamps 27 is a transparent plastic cover member 31 which is attached to the base member 3. The cover member 31 includes a frosted portion 33 and a curved lens 35 for each one of the flashlamps 27. This curved lens 35 serves to direct the light obtained upon energization of each of the flashlamps 27.

More specifically, FIG. 3 is a rear elevational view of the transparent cover member 31 of FIG. 1 illustrating the prismatic barrier dividers 37. These prismatic dividers 37 extend outwardly from the cover member 31 between each pair of flashlamps 27, 28 and toward the circuit board, 7 of FIG. 1. Each of the prismatic dividers 37 includes at least one prismatic surface 39 which is immediately adjacent the flashlamp 28 which is to be protected from the radiant energy of an adjacent energized lamp 27. Thus, the lamp 28 which is to be protected (shielded) from sympathetic flashing is adjacent the prismatic surface 39.

In greater detail, FIG. 4 illustrates the above-mentioned prismatic surface 39. Preferably, the prismatic barrier divider 33 is molded with a prismatic surface 39 on one side thereof with a series of prisms 41 having 45° angle and an included angle α of 90°. Although prism face angles of about 45° degrees are preferred, other angles are also appropriate and provide satisfactory results in the above-mentioned structures. Further, the above-mentioned prismatic barrier divider 37 may include a prismatic surface 39 on each side thereof although it has been found that a single prismatic surface 39 is adequate and especially suitable to a molding technique.

As a specific example of the effectiveness of the above-mentioned configuration, a comparison test was made with a molded plastic cover member 31 and flashlamps having an outer diameter of about 0.230-inch and containing 10 milligrams of shredded zirconium. The cover member 31 of the control test had a divider of 0.030-inch polystyrene while the test structure had a prismatic barrier divider wherein the divider has a thickness of about 0.025-inch with prism ridges about 0.016-inch deep. The flashlamps were spaced about 0.375-inch between axis and a fresh lamp was used for each trial of sympathetic flashing. The following result was obtained:

| BARRIER | NO. FLASHES/ NO. TESTED | % FLASHED |
| --- | --- | --- |
| 0.025" prismatic | 0/25 | 0% |
| 0.030 polystyrene | 3/3 | 100% |

A similar test was made comparing a molded with a matte divider surface and a prismatic divider wherein the flashlamps had a diameter of 0.300 and contained about 14.5 mg of shredded zirconium. The following result was obtained.

| BARRIER | NO. FLASHES/ NO. TESTED | % FLASHED |
| --- | --- | --- |
| 0.025 prismatic | 0/25 | 0% |
| 0.050 molded matte | 4/10 | 40% |

Accordingly, the above comparison tests clearly indicated the advantages of a prismatic barrier divider intermediate adjacent flashlamps in a multilamp photoflash array. As can readily be seen, sympathetic flashing is greatly reduced with a prismatic barrier divider while the cost and reliability are enhanced due to the ease with which the structure may be fabricated.

While there has been shown and described what is at present considered the preferred embodiments of the invention, it will be obvious to those skilled in the art that various changes and modifications may be made therein without departing from the invention as defined by the appended claims.

I claim:

1. A miniaturized multilamp photoflash array comprising
   a base member formed to receive a circuit board
   a circuit board with a printed circuit on one surface thereof and affixed to said base member;
   a plurality of flashlamps in parallel alignment and affixed to said circuit board; and
   a transparent plastic cover member affixed to said base member and enclosing said circuit board and flashlamps therebetween, said cover member including at least one prismatic barrier divider extending outwardly therefrom toward said circuit board and intermediate a pair of said flashlamps to serve as a shield whereby sympathetic flashing of adjacent flashlamps is reduced.

2. The multilamp photoflash array of claim 1 wherein said cover member includes a plurality of said prismatic barrier dividers each having a prismatic surface adjacent a flashlamp.

3. The multilamp photoflash array of claim 1 wherein said prismatic barrier dividers each have a pair of prismatic surfaces adjacent a pair of adjacent flashlamps.

4. The multilamp photoflash array of claim 1 wherein said prismatic barrier divider are transparent and include at least one prismatic surface.

5. The multilamp photoflash array of claim 1 wherein said prismatic barrier divider includes at least one prismatic surface with a series of prisms having a 90 degree included angle.

6. The multilamp photoflash array of claim 1 wherein said prismatic barrier divider includes at least one prismatic surface having a plurality of prisms mounted parallel to the longitudinal axis of said parallel mounted flashlamps.

7. In a multilamp photoflash array having a base member, a circuit board with a printed circuit thereon affixed to said base member, a plurality of parallel aligned flashlamps affixed to said circuit board and a transparent plastic cover member enclosing said circuit board and flashlamps and affixed to said base member, said plastic cover member having at least one prismatic barrier divider extending outwardly therefrom toward said circuit board and between a pair of said parallel aligned flashlamps to serve as a shield whereby sympathetic flashing of said flashlamps is reduced by said dividers.

8. In the multilamp photoflash array of claim 7, said prismatic barrier divider having at least one prismatic surface adjacent a flashlamp.

9. In the multilamp photoflash array of claim 7, said circuit board having a longitudinal axis, said parallel aligned flashlamps positioned normal to said longitudinal axis and said prismatic barrier divider located between a pair of said parallel aligned flashlamps.

10. In the multilamp photoflash array of claim 7, wherein said prismatic barrier divider has at least one prismatic surface adjacent a flashlamp.

11. In the multilamp photoflash array of claim 7, said prismatic barrier divider having a prismatic surface with a pair of prisms having a 90 degree included angle.

12. In the multilamp photoflash array of claim 7, said prismatic barrier divider having a prismatic surface wherein end pair of prisms have an included angle of 90 degrees.

* * * * *